US008514438B2

(12) United States Patent
Nishio

(10) Patent No.: US 8,514,438 B2
(45) Date of Patent: Aug. 20, 2013

(54) PRINT CONTROL DEVICE, METHOD, SYSTEM AND RECORDING MEDIUM FOR COMMUNICATING WITH PLURALITY OF TYPES OF PRINTERS

(75) Inventor: Motokazu Nishio, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 226 days.

(21) Appl. No.: 13/053,530

(22) Filed: Mar. 22, 2011

(65) Prior Publication Data

US 2011/0235115 A1 Sep. 29, 2011

(30) Foreign Application Priority Data

Mar. 24, 2010 (JP) ................................. 2010-068731

(51) Int. Cl.
*G06F 3/12* (2006.01)
(52) U.S. Cl.
USPC ........... 358/1.15; 358/1.9; 358/1.13; 715/273
(58) Field of Classification Search
USPC ....................................... 358/1.15; 715/274
See application file for complete search history.

(56) References Cited

U.S. PATENT DOCUMENTS

| 5,748,342 | A  | * | 5/1998  | Usami ........................... | 358/500 |
| 8,074,180 | B2 | * | 12/2011 | Yamada ......................... | 715/781 |
| 8,159,714 | B2 | * | 4/2012  | Ishida ............................ | 358/1.6 |
| 2002/0046238 | A1 | * | 4/2002 | Estavillo et al. .............. | 709/203 |
| 2006/0221416 | A1 | * | 10/2006 | Yamada ....................... | 358/527 |
| 2006/0256372 | A1 | * | 11/2006 | Suzuki ......................... | 358/1.15 |
| 2006/0279776 | A1 | * | 12/2006 | Akiyama ...................... | 358/1.15 |
| 2007/0273895 | A1 | * | 11/2007 | Cudd et al. ................... | 358/1.1 |
| 2009/0257097 | A1 | * | 10/2009 | Ishida .......................... | 358/448 |
| 2010/0309515 | A1 | * | 12/2010 | Odagawa ..................... | 358/1.15 |

FOREIGN PATENT DOCUMENTS

| JP | 11-031059 A   | 2/1999  |
| JP | 2006-053642 A | 2/2006  |
| JP | 2006-277605 A | 10/2006 |
| JP | 2008-009773 A | 1/2008  |
| JP | 2008-304709 A | 12/2008 |

* cited by examiner

*Primary Examiner* — Twyler Haskins
*Assistant Examiner* — Dennis Dicker
(74) *Attorney, Agent, or Firm* — Edwards Wildman Palmer LLP; David G. Conlin; Stephen D. LeBarron

(57) ABSTRACT

The present invention provides a printer control device that includes a storage device, a printer searching section, a print preview creation section and a display control section. The printer searching section searches for printers connected to a network, acquires pieces of print setup information on print setups set in extracted printers, correlates the pieces of acquired print setup information with the respective printers and stores the information in the storage device. The print preview creation section creates pieces of print preview data of designated data for respective printers, and the display control section causes an identical display device to simultaneously be displayed as a print preview. Utilizing the present invention it possible to arrange and display, on the identical display device, a plurality print previews each schematically showing a print result brought by a plurality of printing apparatuses so that a user can easily select a desired print apparatus.

11 Claims, 9 Drawing Sheets

F I G. 3
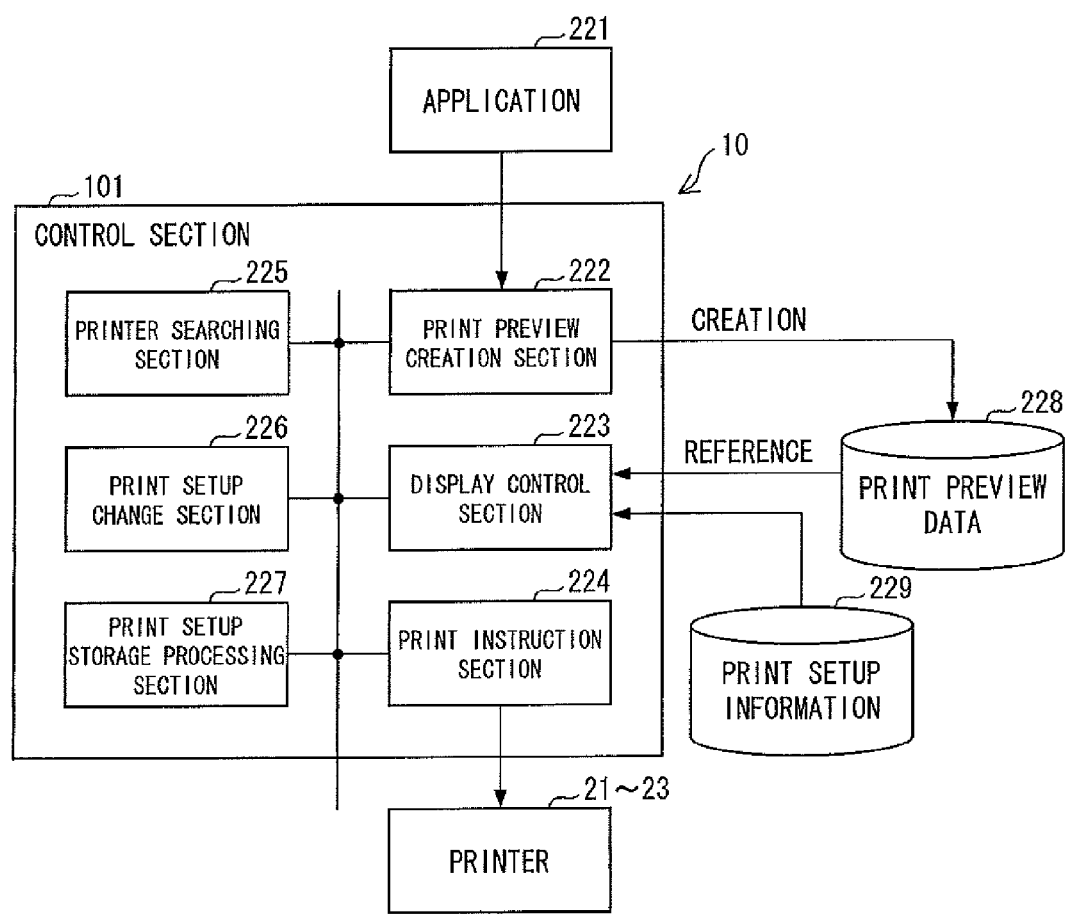

F I G. 9
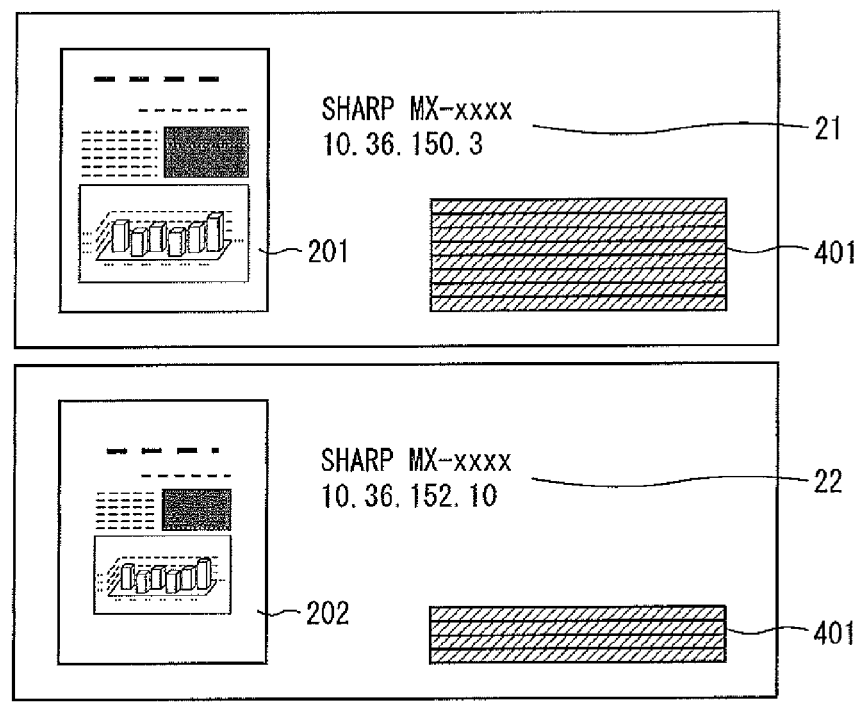

PRINT CONTROL DEVICE, METHOD, SYSTEM AND RECORDING MEDIUM FOR COMMUNICATING WITH PLURALITY OF TYPES OF PRINTERS This Nonprovisional application claims priority under 35 U.S.C. §119(a) on Patent Application No. 2010-068731 filed in Japan on Mar. 24, 2010, the entire contents of which are hereby incorporated by reference.

TECHNICAL FIELD

The present invention relates to a print control device, a print control method, a printing system and a recording medium for displaying a preview image of image data to be printed by a printing apparatus.

BACKGROUND ART

Generally, a personal computer (hereinafter simply referred to as a PC) is connected to a printing apparatus (hereinafter referred to as a printer), and the printer prints image data stored in the PC onto a recoding paper. In order to print, software called a printer driver is installed on the PC.

A shared printer driver applicable to a plurality of printers is known as the printer driver. The shared printer driver searches for a printer connected to the PC via a network, determines a printer to be used among extracted printers, and then causes a display section of the PC to display thereon a printer driver-user interface corresponding to the determined printer. In the displayed printer driver user interface, a user determines a printer to be used and inputs a print setup so that the determined printer prints. In this manner, the user obtains a desired printed image.

The PC has a function of displaying at user's request a print preview that schematically shows an image to be printed by the printer. Patent Literature 1 discloses a print preview function by which a print preview of data determined by a user is displayed on the display section of the PC.

CITATION LIST

Patent Literature

Patent Literature 1
Japanese Patent Application Publication, Tokukai No. 2006-277605 A (Publication Date: Oct. 12, 2006)

SUMMARY OF INVENTION

Technical Problem

However, according to the print preview function disclosed in Patent Literature 1, print previews of a piece of data can not be displayed in such a manner that the preview is displayed in a way corresponding to the printers extracted by searching as candidates of printers for printing the piece of data. Further, according to a technique described in Patent Literature 1, printer drivers corresponding to the respective printers should be installed on a PC. That is, a user has to command to individually display the print previews corresponding to the respective printer drivers installed on the PC. As described above, Patent Literature 1 has a problem that it is impossible to display the print previews corresponding to the respective printers connected to the PC via a network and to easily compare images to be printed by the respective printers.

In order to solve the above problem, an object of the present invention is to provide: a print control device; a print control method; a printing system; a program; and a recording medium for displaying, on a display section, a plurality of print previews each schematically showing an image to be printed by a plurality of printing apparatuses selectable as a printing apparatus that prints the image so that a user can easily select a desired printing apparatus.

Solution to Problem

In order to attain the object, a printer control device of the present invention, which is communicable with plural types of printers via a network and controls the plural types of printers by means of a shared printer driver compatible with the plural types of printers, the printer control device, including: a storage device; printer searching section for searching for the printers connected to the network so as to extract printers from among the printers, and causing to store, in the storage device, pieces of print setup information on print setups to be set in each extracted printer in such a manner that the pieces of print setup information are correlated with the each extracted printer respectively; print preview creation section for creating pieces of print preview data of print previews for each extracted printer respectively, each piece of the print preview data showing a print result of designated data; and display control section for causing an identical display device to simultaneously display, as the print preview, the pieces of print preview data created by the print preview creation section, the display device displaying the pieces of print preview data in such a manner that the pieces of print preview data reflect the pieces of print setup information of the printers respectively corresponding to the respective pieces of print preview data and are arranged in association with the printers respectively corresponding to the respective pieces of print preview data.

A printer control method of the present invention for communicating with plural types of printers via a network and controlling the plural types of printers by means of a shared printer driver compatible with the plural types of printers, the printer control method including: a printer searching step for searching for the printers connected to the network so as to extract printers from among the printers, and causing to store, in the storage device, pieces of print setup information on print setups to be set in each extracted printer in such a manner that the pieces of print setup information are correlated with the each extracted printer respectively; a print preview creation step for creating pieces of print preview data of print previews for each extracted printer respectively, each piece of the print preview data showing a print result of designated data; and a display control step for causing an identical display device to simultaneously display, as the print preview, the pieces of print preview data created in the print preview creation step, the display device displaying the pieces of print preview data in such a manner that the pieces of print preview data reflect the pieces of print setup information of the printers respectively corresponding to the respective pieces of print preview data and are arranged in association with the printers respectively corresponding to the respective pieces of print preview data.

According to the above arrangement, the printer searching section (printer searching step) searches for the printers connected to the network so as to extract the printers from among the printers, and causes to store, in the storage device, the pieces of print setup information on the print setups to be set in each extracted printer in such a manner that the pieces of print setup information are correlated with the each extracted printer respectively. The print preview creation section (print preview creation step) creates the pieces of print preview data of the print previews for the respective printers extracted by the searching operation of the printer searching section (printer searching step), each piece of the print preview data showing a print result of designated data to be printed. The display control section (display control step) causes the identical display device to simultaneously display, as the print preview, the pieces of print preview data created by the print preview creation section (print preview creation step), the display device displaying the pieces of print preview data in such a manner that the pieces of print preview data reflect the pieces of print setup information of the printers respectively corresponding to the respective pieces of print preview data and are arranged in association with the printers respectively corresponding to the respective pieces of print preview data.

According to the above arrangement, it is possible to simultaneously display, on the identical display device, the print previews corresponding to the printers selectable as a printer to be employed in such a manner that the pieces of print preview data reflect the pieces of print setup information of the printers respectively corresponding to the respective pieces of print preview data and are arranged in association with the printers respectively corresponding to the respective pieces of print preview data. This allows a user to easily select a desired printer as a printer to be employed by seeing the displayed print previews corresponding to the printers.

Advantageous Effects of Invention

According to the arrangement of the present invention as described above, it is possible to simultaneously display, on an identical display device, print previews corresponding to printers selectable as a printer to be employed in such a manner that the pieces of print preview data reflect the pieces of print setup information of the printers respectively corresponding to the respective pieces of print preview data and are arranged in association with the printers respectively corresponding to the respective pieces of print preview data. This allows a user to easily select a desired printer as the printer to be employed by seeing the displayed print previews corresponding to the printers.

BRIEF DESCRIPTION OF DRAWINGS

FIG. 3 is a block diagram showing a configuration of a control section included in the PC shown in FIG. 2.

FIG. 9 is a view showing an example of a print preview display screen displayed on the display section controlled by the display control section shown in FIG. 3 on which print preview display screen print previews corresponding to printers and waiting job quantities of the printers are displayed.

DESCRIPTION OF EMBODIMENTS

The following describes an embodiment of the present invention with reference to Figures.

Figure 1:
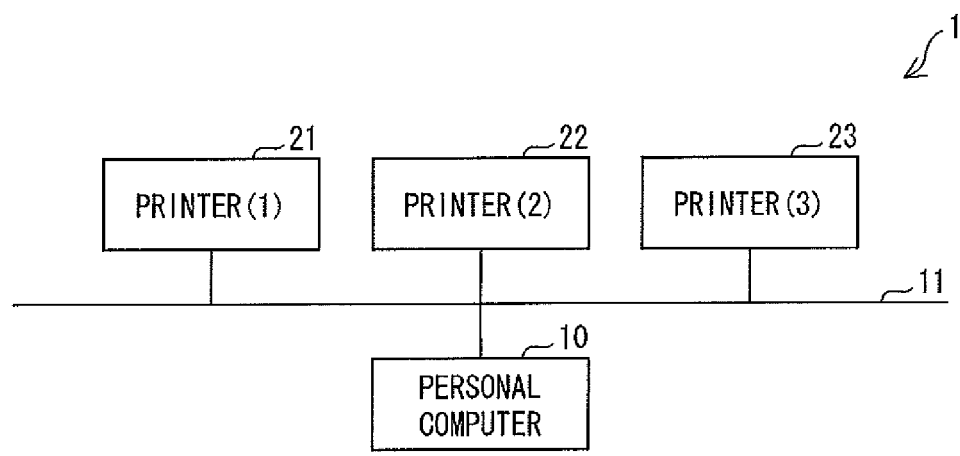
FIG. 1 is a block diagram showing a configuration of a printing system provided with a PC serving as a print control device in accordance with an embodiment of the present invention.

FIG. 1 is a block diagram showing a configuration of a printing system 1 in accordance with an embodiment of the present invention. As shown in FIG. 1, the printing system 1 is provided with a personal computer (hereinafter simply referred to as a PC) 10, a network 11, and the first to third printers 21 to 23. In the printing system 1, the PC 10 is connected to the first to third printers 21 to 23 via the network 11. The first to third printers 21 to 23 each may be, for example, a MFP (multi function printer).

The PC 10 has a printer driver installed thereon. Therefore, the PC 10 of the present embodiment serves as a printer control device. The printer driver is a so-called shared printer driver (universal printer driver) compatible with a plurality of printers by a single printer driver. The PC 10 displays a user interface on a display section 104. This is a function of the printer driver.

Figure 2:
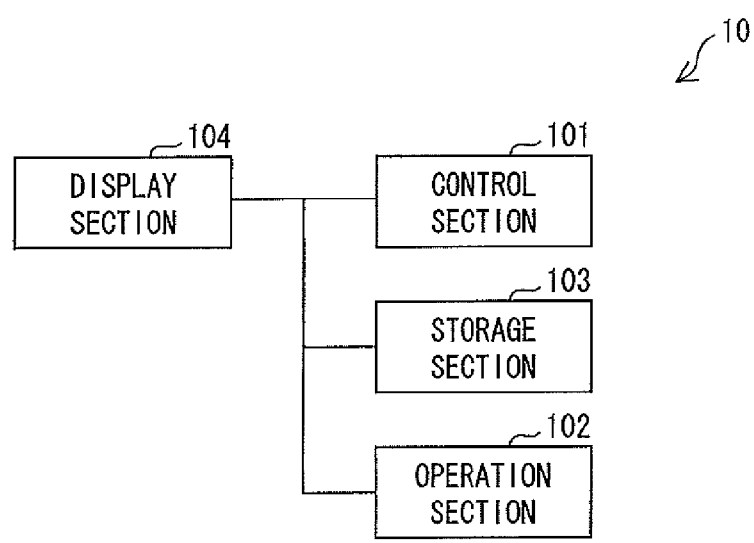
FIG. 2 is a block diagram showing a configuration of the PC shown in FIG. 1.

FIG. 2 is a block diagram showing a configuration of the PC 10. The PC 10 includes a control section 101, an operation section 102, a storage section (storage device) 103 and the display section (display means) 104.

The control section 101 controls functions of all user interfaces and an operation of the PC 10 which operation relates to printing. Specifically, the control section 101 creates a user interface for selecting a printer to be employed, a user interface for setting a print setup corresponding to a selected printer and like user interfaces, and causes the display section 104 to display these user interfaces. The control section 101 also creates print preview data for displaying a print preview that schematically shows data to be printed by the printer which data is determined by a user (hereinafter referred to as user determination data), and causes the display section 104 to display the print preview of the data. Further, the control section 101 creates print data for printing the user determination data by use of any one of the printers.

The operation section 102 includes input devices such as a mouse and a keyboard, and transmits an operation of a user to the storage section 103. The storage section 103 may be the storage devices such as a hard disk and a memory, and stores preview data, various setup information and the like. The display section 104 is controlled by the control section 101 thereby displaying various information.

FIG. 3 is a block diagram showing a configuration of the control section 101 of the PC 10 shown in FIG. 2. As shown in FIG. 3, the control section 101 includes a print preview creation section (print preview creation means) 222, a display control section (display control means) 223, a print instruction section (print instruction means) 224, a printer searching section (printer searching means) 225, a print setup change section (print setup change means) 226, and a print setup storage processing section (print setup storage processing means) 227.

The printer searching section 225 searches for the printers (the first to third printers 21 to 23) connected to the network 11, and acquires print setup information on a print setup set in the respective printers (the first to third printers 21 to 23) extracted by the searching operation. The printer searching section 225 also acquires printer information on a function of the respective printers from the respective printers (the first to third printers 21 to 23) extracted by the searching operation. The printer searching section 225 then causes to store, in the storage section 103, the acquired print setup information and printer information in such a manner that the acquired print setup information and printer information are correlated with the respective printers corresponding to these information.

The storage section 103 stores various information on the first to third printers 21 to 23 extracted by the searching operation of the printer searching section 225.

The print preview creation section 222 creates print preview data 228 of user determination data for the respective first to third printers 21 to 23 extracted by the searching operation of the printer searching section 225. The print preview data 228 is data for displaying a print preview that schematically shows an image to be printed by a printer. An application 221 for creating the print preview data 228 is preinstalled on the PC 10.

The display control section 223 causes an identical display section 104 to simultaneously display the pieces of print preview data created by the print preview creation section 222. The display section 104 displays the pieces of print preview data in such a manner that the pieces of print preview data are associated with the respective printers corresponding to the pieces of print preview data and arranged on the identical display section 104. In this case, the display control section 223 reads the print setup information of the printers (the first to third printers 21 to 23) from the storage section 103, and causes the display section 104 to display the print preview data corresponding to the respective printers in such a way that the read print setup information is reflected on the print preview data.

The print setup change section 226 receives an instruction, from a user, for changing a print setup. In a case where the print setup change section 226 receives, from a user, the instruction for changing the print setup corresponding to a printer determined by the user, the print setup change section 226 extracts print setup information corresponding to the printer from the storage section 103, and changes the extracted print setup according to the instruction for changing.

In a case where an instruction for storing the changed print setup information is inputted from a user, the print setup storage processing section 227 stores, in the storage section 103, the print setup information changed by the print setup change section 226.

The print instruction section 224 converts the user determination data into print data for printing the user determination data by use of a determined printer, and outputs the converted print data to the determined printer.

Figure 4:
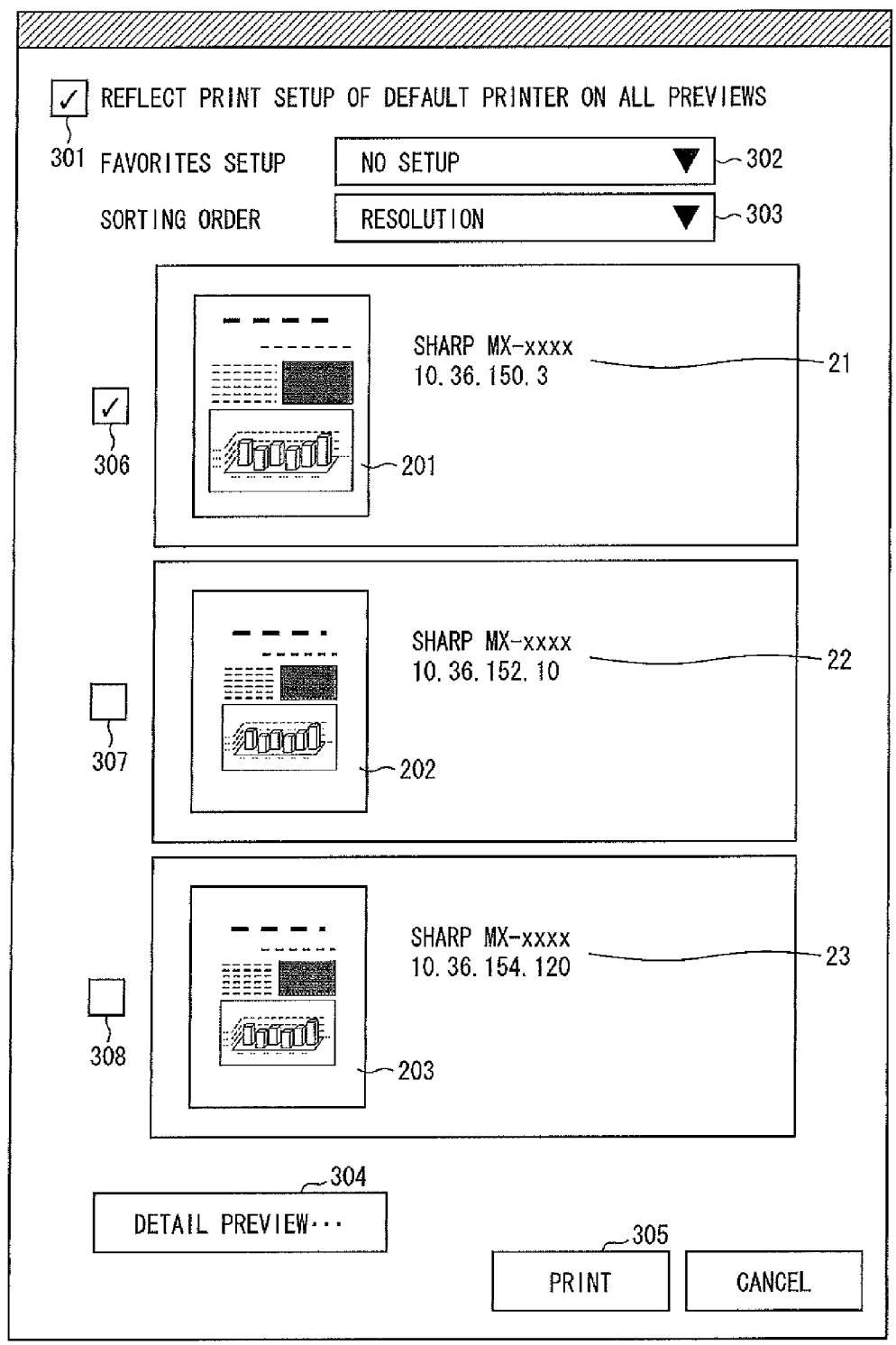
FIG. 4 is a view showing a print preview display screen displayed on a display section controlled by the display control section shown in FIG. 3.

FIG. 4 is a view showing a state where the display section 104 controlled by the display control section 223 displays a print preview, that is, a view showing a print preview display screen.

As shown in FIG. 4, the print preview display screen simultaneously displays a print preview 201 corresponding to the first printer 21, a print preview 202 corresponding to the second printer 22 and a print preview 203 corresponding to the third printer 23. In a case where the user determination data contains data equivalent to a plurality of pages, the respective print previews 201 to 203 displayed on the first page of the plurality of pages are displayed. Further, check boxes (employed printer determination sections) 306 to 308 for selecting a printer to be employed (default printer) by use of, for example, a pointing device are provided in a region next to a region where the print previews 201 to 203 are displayed. As shown in FIG. 4, the check box 306 is checked. This means that the first printer 21 is set as a default printer.

A check box 301, an input section (named print setup information extraction instruction section) 302 and an input section (sort instruction section) 303 are provided, in this order from above, above the region where the print previews 201 to 203 are displayed. The check box 301 is a check box for selecting reflecting, on all previews, a print setup of the default printer. The input section 302 is an input section for extracting a stored print setup on which a given name is put.

The input section 303 is an input section for determining a condition under which the first to third printers 21 to 23 are sorted. As shown in FIG. 4, resolution is selected in the input section 303. In this case, the print previews 201 to 203 corresponding to the first to third printers 21 to 23 are displayed from above on the print preview display screen in an increasing or decreasing order of the resolution of the print previews 201 to 203.

The above-described sorting can be conducted after the following process. The printer searching section 225 acquires the print setup information on the print setup set in the respective printers (the first to third printers 21 to 23) and the printer information on the function of the respective printers (the first to third printers 21 to 23) in a case where the printer searching section 225 searches for the printers (the first to third printers 21 to 23) connected to the network 11. Thereafter, the printer searching section 225 correlates the acquired printer information with a printer having the printer information, and causes the storage section 103 to store the printer information in correlation with the printer.

Further, an input section 304 and an input section 305 are provided, in this order from above, below the region where the print previews 201 to 203 are displayed. The input section 304 is an input section for instructing to display a detailed print preview (hereinafter referred to as a detail preview) corresponding to a printer whose check box 306, 307 or 308 is checked. As shown in FIG. 4, the check box 306 of the first printer 21 is checked. Therefore, in a case where the input section 304 is operated, a detail preview (detailed print preview) corresponding to the first printer 21 is displayed.

The input section 305 is an input section for instructing the printer whose check box 306, 307 or 308 is checked to print. As shown in FIG. 4, the check box 306 of the first printer 21 is checked. Therefore, in a case where the input section 305 is operated, the first printer 21 prints data whose print preview is displayed.

Figure 5:
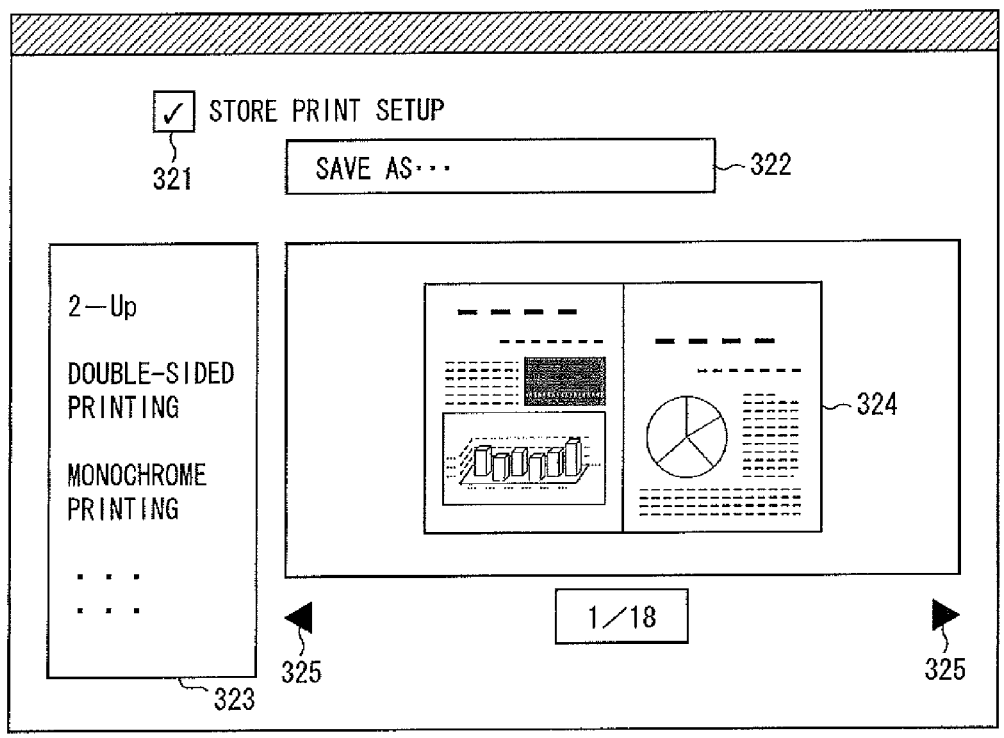
FIG. 5 is a view showing a detail preview display screen displayed on the display section controlled by the display control section shown in FIG. 3.

FIG. 5 is a view showing a state where a detail preview is displayed on the display section 104 controlled by the display control section 223, that is, a view showing a detail preview display screen displayed in a case where the input section 304 for instructing to display the detail preview is operated on the print preview display screen shown in FIG. 4.

As shown in FIG. 5, the detail preview display screen displays a detail preview 324 of the print preview 201 corresponding to the checked check box 306. In a case where the user determination data corresponding to the print preview 201 includes data equivalent to a plurality of pages, it is possible to display the detail preview 324 of the data equivalent to the plurality of pages. Specifically, it is possible to sequentially turn a displayed page by operating any one of two arrows 325 that is provided below the detail preview 324.

Further, a print setup section 323 is provided in a region next to a region where the detail preview 324 is displayed. The print setup section 323 is an input section for setting 2-UP printing, double-sided printing, monochrome printing, color printing or other printing. 2-UP printing is printing by which data equivalent to 2 pages is printed on one page. Further, a check box (first print setup storage instruction section) 321 and an input section (second print setup storage instruction section) 322 are provided, in this order from above, above the detail preview 324. The check box 321 is a check box for instructing to store a print setup set by the print setup section 323, that is, a print setup changed by the print setup change section 226. The input section 322 is an input section not for reflecting, on the print setup information stored in the storage section 103, the print setup set by the print setup section 323, that is, the print setup changed by the print setup change section 226 (updating the print setup information) but for instructing to store the print setup on which a name different from the name put on the print setup information is put.

The print setup section 323 is controlled by the display control section 223 and the print setup change section 226. The check box 321 is controlled by the print setup change section 226. Specifically, the print setup set by the print setup section 323 is reflected on the detail preview 324 by the display control section 223. In a case where the check box 321 is checked, the print setup change section 226 updates, according to the print setup set by the print setup section 323, the print setup information on a printer corresponding to the detail preview 324 which print setup information is stored in the storage section 103.

Figure 6:
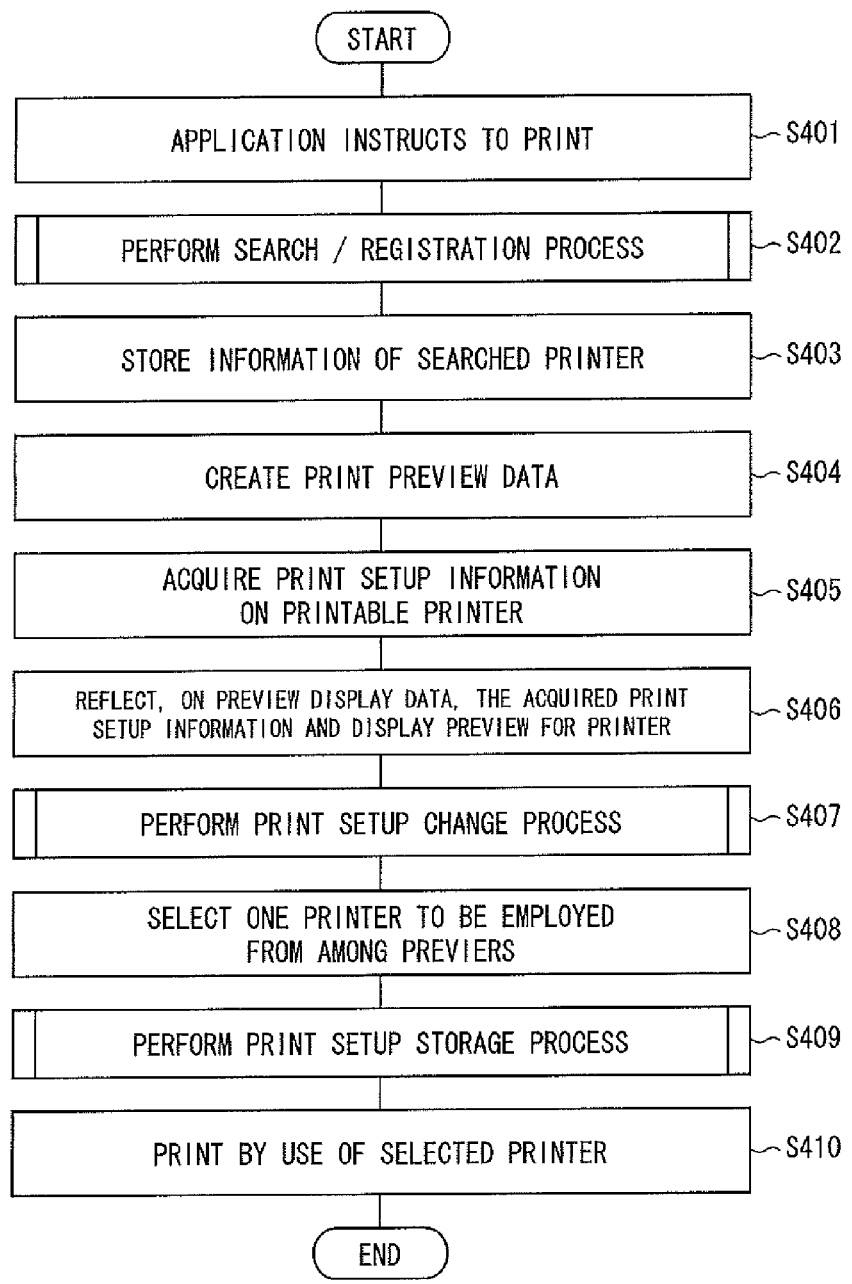
FIG. 6 is a flowchart showing an operation of the PC serving as the print control device shown in FIG. 3.

The following describes an operation of the PC 10 serving as the print control device that has the above-described arrangement, with reference to the flowchart shown in FIG. 6.

In a case where certain application software installed on the PC 10 instructs to print user determination data (S401), the printer searching section 225 searches for the printers (the first to third printers 21 to 23) connected to the network 11 (S402).

Further, the printer searching section 225 acquires information on the printers (the first to third printers 21 to 23) extracted by the searching operation, and causes the storage section 103 to store the acquired information (S403). The information acquired by the searching operation includes the print setup information on the print setup set in the respective printers (the first to third printers 21 to 23), and the printer information containing the information on the function of the respective printers (the first to third printers 21 to 23). The printer searching section 225 causes to store, in the storage section 103, these print setup information and printer information in such a manner that these print setup information and printer information are correlated with the respective printers.

The printer information includes information on a model name and an IP address of the respective printers, a site where the respective printers are positioned. Further, S402 and S403 may be conducted when the PC 10 has a printer driver installed thereon or when a power source of the PC 10 is turned on.

An arrangement of acquiring the print setup information is not limited to the arrangement in which the print setup information is acquired by the searching operation of the printer searching section 225. The PC 10 may acquire a defaulted print setup of the respective printers by installing, via an installer, the printer driver containing the defaulted printer setup.

Subsequently, the print preview creation section 222 creates print preview data corresponding to the respective printers (the first to third printers 21 to 23) (S404).

Subsequently, the display control section 223 causes the display section 104 to simultaneously display the pieces of created print preview data in such a manner that the pieces of created print preview data are arranged in association with the respective printers. At this time, the display control section 223 acquires, from the storage section 103, print setup information on the respective printers capable of outputting (printable) (S405), and reflects the acquired print setup information on respective print preview data (S406).

The following describes in detail processes of the above-described S401 to S406. The PC 10 transmits a query signal to all devices (network devices) connected to the network 11, by means of broadcasting according to a conventionally well-known protocol such as a SNMP. In response to the query signal, the network devices transmit, to the PC 10, information on an IP address, a name, a function and the like of the network devices. A printer corresponding to a shared driver is extracted on the basis of the name of the device among the information transmitted to the PC 10. Subsequently, information on the extracted printer is displayed as shown in FIG. 4.

According to the above-described processes, it is possible to display current print setups of the printers on the print previews corresponding to the printers which print previews are displayed on the display section 104, that is, on the print preview display screen. The printers capable of outputting (printable) are, for example, printers which are turned on and whose print setup information and printer information are acquired as of the searching operation of the printer searching section 225.

In a case where, in S406, the check box 301 is checked to instruct to reflect the print setup of the default printer over all previews, the print setup of the default printer is reflected on the all print previews of the printers.

Specifically, in order to reflect, on the all print previews of the printers, the print setup of the printer (default printer) selected by checking the check boxes 306 to 308 displayed on the print preview display screen, a user checks the check box 301. In a case where the check box 301 is checked, the display control section 223 reflects the print setup of the selected printer on the all print previews corresponding to the printers which all print previews are displayed on the print preview display screen. For example, in a case where the print setup of the selected printer is set to monochrome printing, the all print previews corresponding to the printers which all print previews are displayed on the print preview display screen are monochromatically displayed.

Further, in a case where sort conditions of the first to third printers 21 to 23 are inputted in the input section 303, the display control section 223 sorts the first to third printers 21 to 23 according to the sort conditions, and causes the display section 104 to display, in an order in accordance with a sort result, the print previews 201 to 203 corresponding to the first to third printers 21 to 23. For example, the printer information on the printers which printer information is stored in the storage section 103 is to be sorted.

In a case where a user inputs, on the print preview display screen or the detail preview display screen, an instruction for changing the print setup, the print setup change section 226 changes, according to the instruction of the user, the print setup of the printer whose detail preview is displayed on the detail preview display screen (S407). In this case, the display control section 223 reflects, on the detail preview 324, the print setup updated by the change process.

Thereafter, in a case where a printer is selected on the print preview display screen or the detail preview display screen (S408), the print setup change section 226 reflects, on print setup information on the selected printer, the print setup updated on the print preview display screen or the detail preview display screen. In this case, the print setup change section 226 reads the print setup information stored in the storage section 103 and then changes a print setup of the read print setup information (S409).

The print instruction section 224 creates print data of user determination data, transmits the created print data to a printer selected as a printer to which the created print data is outputted, and instructs the selected printer to print according to a set print setup (S410).

Figure 7:
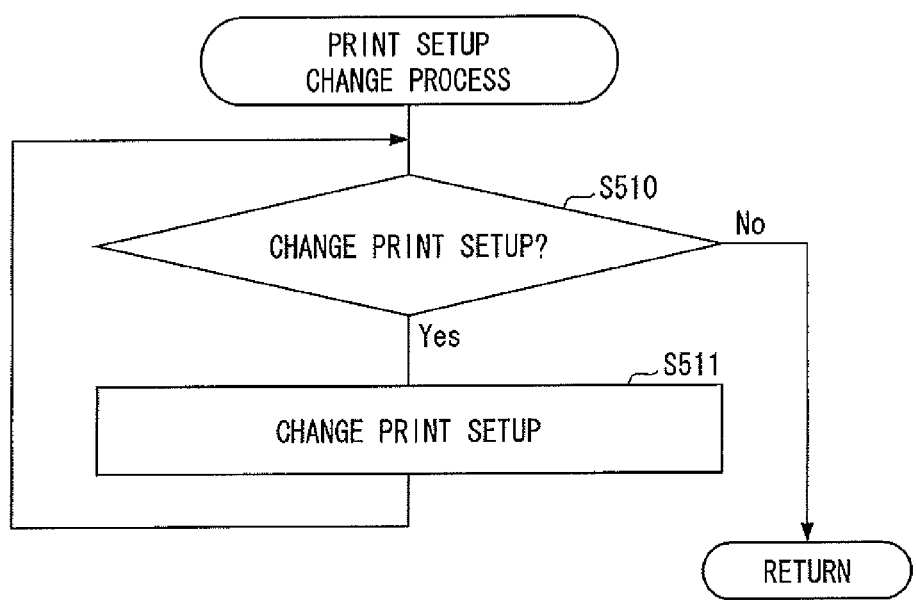
FIG. 7 is a flowchart showing how a print setup change section shown in FIG. 3 conducts a print setup change process of S407 shown in FIG. 6.

The following describes in detail the print setup change process of S407 with reference to the flowchart of FIG. 7.

According to the present embodiment, a print setup is basically changed on a detail preview display screen. In a case where a user changes a print setup of any one of the printers (the first to third printers 21 to 23), the user checks the check box 306, 307 or 308 corresponding to the printer whose print setup is to be changed, and instructs, by operating the input section 304, to display a detail preview corresponding to the printer. Alternatively, the user does not check the check boxes 306 to 308 but double-clicks, by a pointing device, on the print preview 201, 202 or 203 corresponding to the printer whose print setup is to be changed. In response to the above operation, the display control section 223 causes the display section 104 to display the detail preview display screen shown in FIG. 5.

In a case where a user changes, in terms of a predetermined item shown in the print setup section 323, the print setup of the printer displayed on the detail preview display screen, the user selects the predetermined item shown in the print setup section 323.

In a case where the predetermined item is selected as described above (S510), the print setup change section 226 changes the print setup according to the instruction of the user. That is, the print setup change section 226 reads, from the storage section 103, the print setup information on the printer displayed on the detail preview display screen, and then updates the read print setup information according to the item selected in the print setup section 323 (S511). In this case, the display control section 223 reflects the updated print setup on the detail preview 324.

As described above, the print setup is changed on the detail preview display screen. However, the print setup may be changed on a print preview display screen, on which the print setup section 323 is provided.

Figure 8:
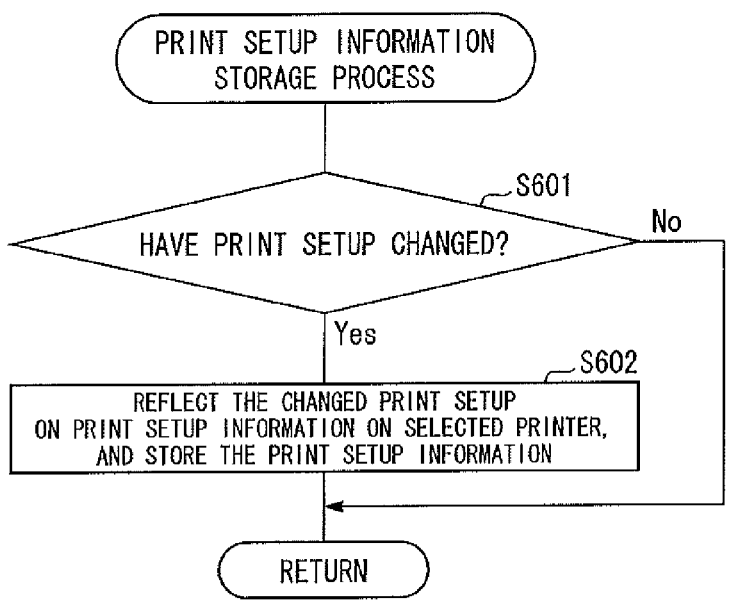
FIG. 8 is a flowchart showing how a print setup storage processing section shown in FIG. 3 conducts a print setup storage process of S409 shown in FIG. 6.

The following describes in detail the print setup storage process of S409 with reference to the flowchart of FIG. 8.

In a case where the print setup is changed by the print setup change section 226 in S407 and the check box 321 for instructing to store the print setup is checked on the detail preview display screen shown in FIG. 5 (S601), the print setup storage processing section 227 stores, in the storage section 103, the print setup changed by the print setup change section 226 (S602).

Further, in a case where no instruction for putting a name on the changed print setup and storing the named print setup is inputted in the input section 322, the print setup storage processing section 227 reflects the changed print setup on the print setup information stored in the storage section 103, and then stores the print setup information in the storage section 103. Meanwhile, in a case where the instruction for putting the name on the changed print setup and storing the named print setup is inputted to the input section 322, the print setup storage processing section 227 names and stores the changed print setup separately from the print setup information stored in the storage section 103.

The print setup information stored in the storage section 103 is read by operating the input section 302 displayed on the print preview display screen shown in FIG. 4. In a case where a plurality of print setup information having different names is stored in the storage section 103, a user operates the input section 302 to display the names on the input section 302, and selects one of the names.

Further, the display control section 223 reflects, on the print preview corresponding to the printer whose check box 306, 307 or 308 is checked, the print setup information selected in the input section 302. In a case where the check box 301 is checked, the display control section 223 reflects, on all print previews displayed on the print preview display screen, the print setup information selected in the input section 302. In this manner, the selected print setup information is employed as the print setup information of the user determination data.

It is accordingly possible to store a print setup often used by a user and a print setup often selected by a user, and also possible to easily extract the stored print setups. This allows a user to efficiently set a print setup appropriate for a user's purpose.

As described above, according to the arrangement of the present invention, the print previews corresponding to the printers selectable as a printer to be employed can be simultaneously displayed on the identical display section 104 in such a manner that the print setup information of the printers corresponding to the print previews is reflected on the print previews and the print previews are arranged in association with the printers corresponding to the print previews. This allows a user to see the displayed print previews of the printers and therefore easily select a desired printer as the printer to be employed.

Further, according to the arrangement of the present embodiment, it is possible to, on the print preview display screen (detail preview display screen), easily change the print setup of data selected to be printed and confirm the print preview displayed according to the changed print setup. Further, on the basis of the changed print setup, it is possible to print by use of the selected printer. This allows a user to easily confirm the print previews, change the print setups and print by use of the printers, as a series of operations.

Furthermore, it is possible to reflect, on the print setup stored in the storage section 103, the print setup changed on the print preview display screen (detail preview display screen) and store the resultant print setup in the storage section 103. This makes it possible to easily employ the changed print setup in successive printings.

Further, in a case where the check box 301 is checked and a print setup of a default printer is changed on the detail preview display screen, the display control section 223 may reflect the changed print setup on all print previews of printers which all print previews are displayed on the print preview display screen (FIG. 4). This makes it possible to compare the all print previews displayed on the print preview display screen with one another, and therefore easily select a desired printer as a printer to be employed. Further, on the basis of the changed print setup, it is possible to print by use of the selected printer. In this manner, a user can easily confirm the print previews, change the print setups and print by use of the printers, as a series of operations.

Further, in a case where the first to third printers 21 to 23 are sorted under a sort condition selected in the input section 303, the display control section 223 causes to display the print previews 201 to 203 corresponding to the first to third printers 21 to 23 in an order in accordance with a sort result. This allows a user to immediately and easily determine, according to the result obtained by sorting under the sort condition such as color/monochrome printing, a print speed or print resolution, a printer appropriate for printing determined data.

Further, not only the print previews corresponding to the printers but also waiting job quantities (the number of pages, the number of items to be printed) may be displayed on the print preview display screen shown in FIG. 4.

FIG. 9 is a view showing an example of a print preview display screen displayed on the display section 104 controlled by the display control section 223 on which print preview display screen print previews corresponding to printers and waiting job quantities of the printers are displayed.

As shown in FIG. 9, the print preview 201 corresponding to the first printer 21 and the print preview 202 corresponding to the second printer 22 are simultaneously displayed on the print preview display screen. A waiting job quantity display region 401 where waiting job quantity of the respective printers is displayed is provided next to the print previews of the respective printers.

The waiting job quantity is displayed by belt-shaped steps in the waiting job quantity display region 401 so that a user can visually know the waiting job quantity of the respective printers. That is, the waiting job quantity is set such that the belt-shaped steps increase in number as the waiting job quantity increases.

Specifically, the waiting job quantity is displayed in the waiting job quantity display region 401 as follows. Via searching for the printers connected to the network 11, the printer searching section 225 acquires, from the respective printers, quantity of job (the number of pages, the number of items to be printed) unfinished to be printed which job the respective printers have. The display control section 223 causes the waiting job quantity display region 401 of the print preview display screen to display the quantity of job unfinished to be printed of the respective printers which quantity is acquired by the printer searching section 225.

As described above, not only the print previews of the printers but also the waiting job quantities of the printers are displayed on the print preview display screen. Therefore, in a case where a user instructs the respective printers to print, the user can visually know a length of waiting time prior to start of printing by use of the respective printers.

Further, a part of an image of the displayed print preview corresponding to the respective printers may be enlarged on the print preview display screen shown in FIG. 4.

Figure 10:
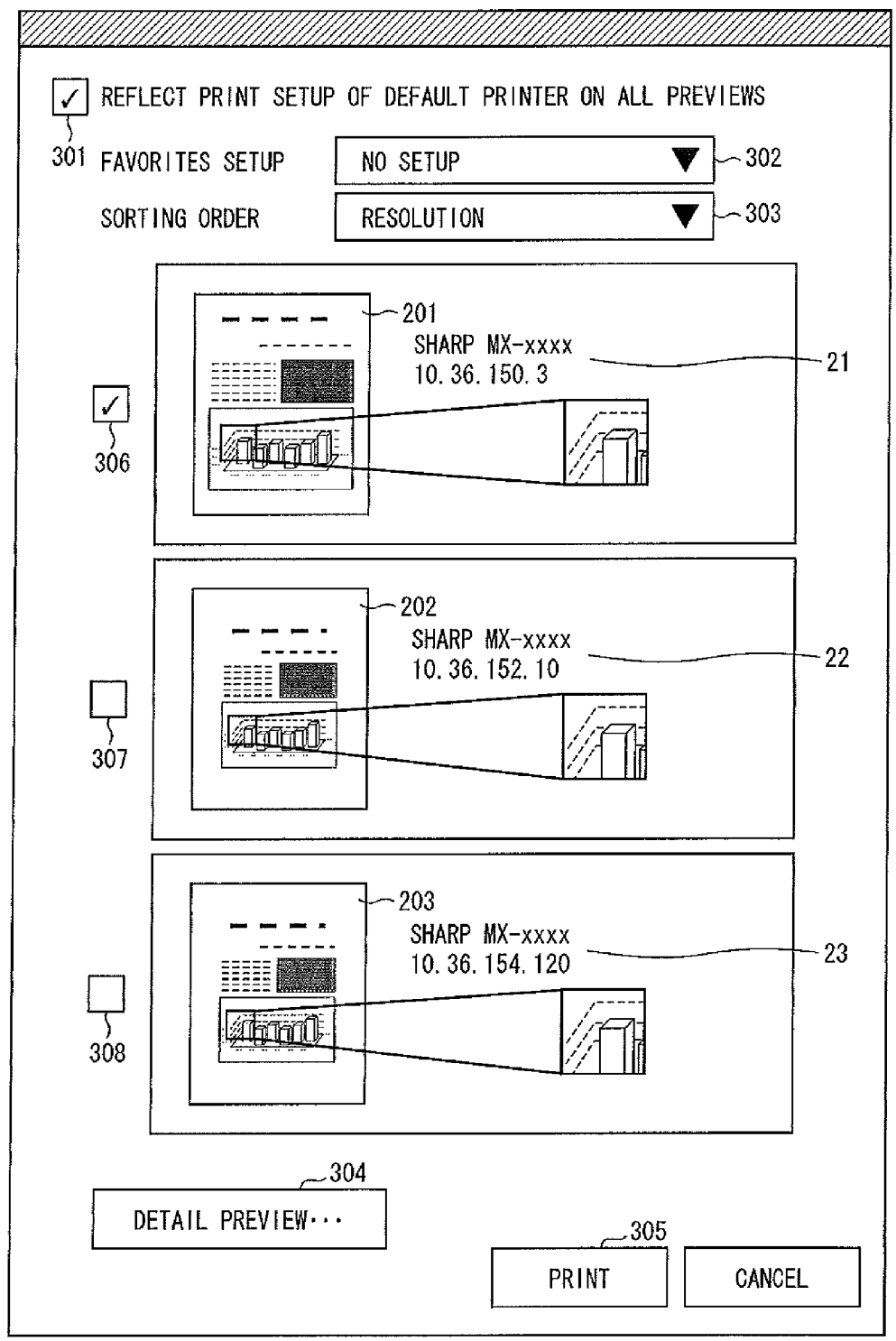
FIG. 10 is a view showing an example of a print preview display screen displayed on the display section controlled by the display control section shown in FIG. 3 on which print preview display screen the print previews corresponding to the printers and enlarged parts of images of the print previews are displayed.

FIG. 10 is a view showing an example of a print preview display screen displayed on the display section 104 controlled by the display control section 223 on which print preview display screen the print previews corresponding to the printers and the enlarged parts of the images of the respective print previews are displayed.

As shown in FIG. 10, the print previews 201 to 203 corresponding to the first to third printers 21 to 23 are simultaneously displayed on the print preview display screen. Further, a part of an image of the respective displayed print previews 201 to 203 is enlarged.

Specifically, the part of the image is enlarged as follows. The display control section 223 causes to enlarge, on the print preview display screen, the part of the image of the respective displayed print previews which part is, for example, predetermined to be enlarged.

As described above, the part of the image of the respective displayed print previews is enlarged on the print preview display screen. This allows a user to visually know difference in resolution between the printers.

Further, in response to a user's instruction for turning pages, the print previews corresponding to the printers may be sequentially paged on the print preview display screen shown in FIG. 4, such that the print previews corresponding to the printers are paged in synchronization with one another.

Figure 11:
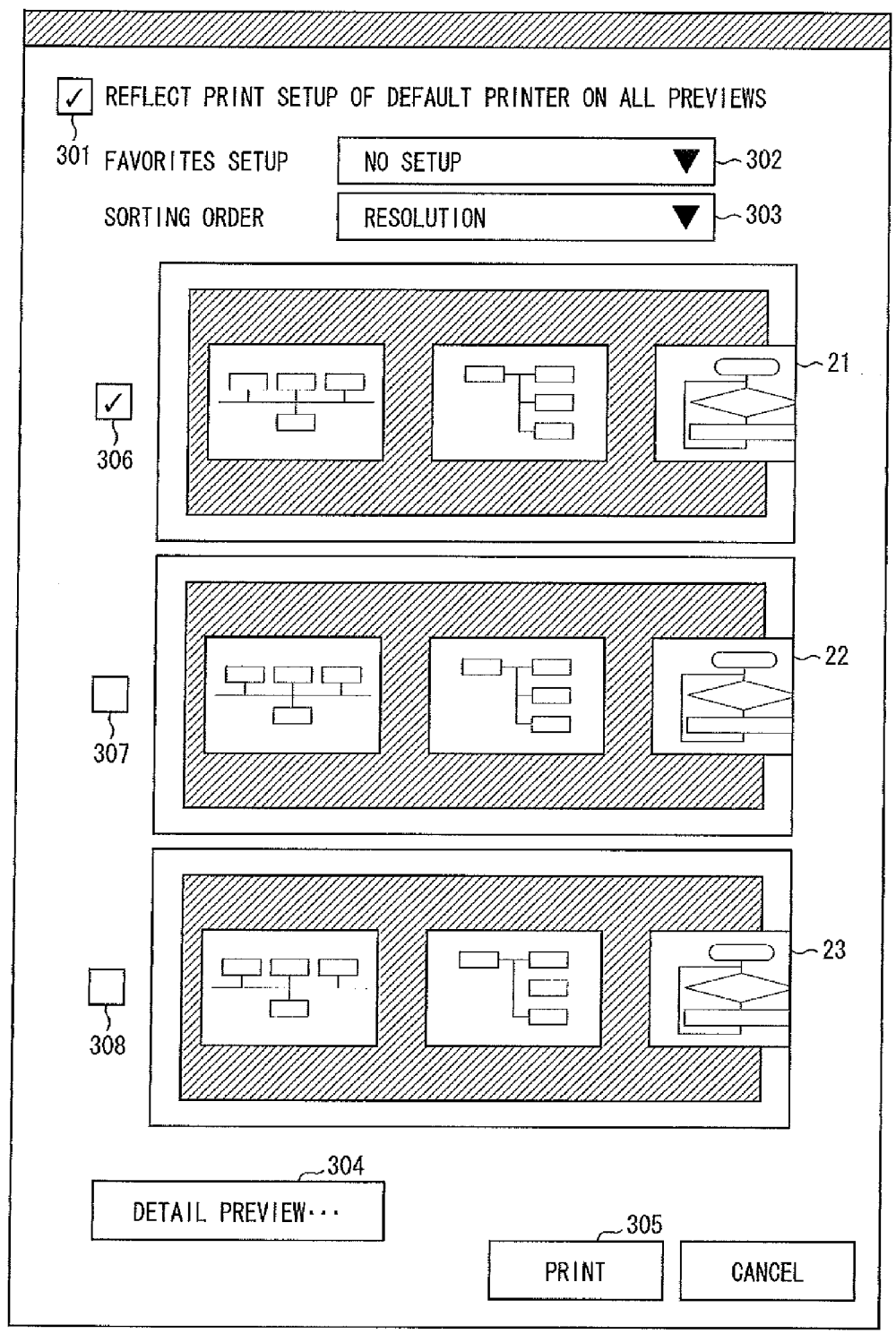
FIG. 11 is a view showing a state in which the print previews corresponding to the printers are paged on the print preview display screen displayed on the display section controlled by the display control section shown in FIG. 3, such that the print previews corresponding to the printers are paged in synchronization with one another.

FIG. 11 is a view showing a state in which print previews corresponding to printers are paged in synchronization with one another on the print preview display screen displayed on the display section 104 controlled by the display control section 223.

As shown in FIG. 11, the print previews corresponding to the first to third printers 21 to 23 are simultaneously displayed on the print preview display screen. The print previews are paged in synchronization with one another in response to a user's instruction for scrolling the screen (print preview). The print previews shown in FIG. 11 are paged in synchronization with one another.

Specifically, in response to a user's operation (input) for instructing to scroll the screen (print preview), the display control section 223 turns, on the print preview display screen, for example, all pages of the respective print previews in synchronization with one another. The user instructs to scroll the print previews by, for example, rotating a wheel of a mouse.

As described above, the print previews corresponding to the printers are paged, on the print preview display screen, in synchronization with one another. This allows a user to easily compare the print previews corresponding to the printers with one another over a plurality of pages.

Further, on the print preview display screen shown in FIG. 4, the displayed print previews corresponding to the printers may be simultaneously, sequentially and automatically paged while being paged at a speed that reflects a printing speed of the respective printers.

What is meant by turning pages at the speed that reflects the printing speed of the respective printers is that a speed at which the respective print previews are simultaneously paged is, for example, a speed that reflects the printing speed itself, or a speed that reflects difference in printing speed between the printers, that is, a speed relatively different in the print previews.

According to the above-described arrangement, on the print preview display screen shown in FIG. 11, the print previews corresponding to the printers are paged at the speed that reflects the printing speed of the respective printers.

Specifically, on the print preview display screen, the display control section 223 turns, for example, all pages of the displayed print previews at the speed that reflects the printing speed of the respective printers.

The display control section 223 acquires, form the printer searching section 225, information on the printing speed of the respective printers which information is necessary for the above-described displaying. Alternatively, the display control section 223 employs the information on the printing speed of the respective printers which information the display control section 223 already has. In a case where the display control section 223 acquires the information from the printer searching section 225, the printer searching section 225 acquires the information on the printing speed from the respective printers via searching for the printers connected to the network 11. Then, the printer searching section 225 transmits, to the display control section 223, the acquired information on the printing speed.

Further, automatically paging the print previews may be automatically commenced on the print preview display screen after the print preview display screen is displayed. Alternatively, paging the print previews may be commenced in response to a user's input to an input section that receives the instruction for commencing to page the print previews, which input section is provided on the print preview display screen.

As described above, the print previews corresponding to the printers are paged on the print preview display screen at the speed that reflects the printing speed of the respective printers. This allows a user to visually know the printing speed of the respective printers from the print previews corresponding to the printers and therefore easily compare difference in printing speed between the printers.

Further, sections of the PC 10 serving as a printer control device, especially the control section 101 may be may be realized by way of hardware or software as executed by a CPU as follows.

The PC 10 includes: a CPU (central processing unit) that executes instructions in control programs realizing the functions; a ROM (read only memory) that contains the control programs; a RAM (random access memory) to which the control programs are loaded; and memory devices (memory media) such as a memory that contains the control programs and various data. An object of the present invention can also be achieved by mounting to the PC 10 a computer-readable storage medium containing a control program code (executable program, intermediate code program, or source program) for the PC 10, which is software realizing the aforementioned functions, in order for the PC 10 (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The PC 10 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a carrier wave or data signal transmission in which the program code is embodied electronically.

The print control device includes print setup change means; and print instruction means, the print display control means (i) causing the display device to display a print preview display screen for displaying a print setup section and an employed printer determination section, the print setup section being for receiving an input regarding the print setups and the employed printer determination section being for receiving designation of a printer to be employed, and (ii) reflecting, on the print previews of printers whose print setups are changed, the changed print setups obtained by changing the print setups of the pieces of print setup information in response to the input to the print setup section, the print setup change means changing, according to the input to the print setup section, the pieces of print setup information of printers designated by the input to the print setup section, the print instruction means instructing the printer determined via the employed printer determination section to print the designated data according to the print setup of the pieces of print setup information changed by the print setup change means.

According to the above arrangement, the display control means causes the display device to display the print preview display screen for displaying the print setup section and the employed printer determination section, the print setup section being for receiving the input regarding the print setups, and the employed printer determination section being for receiving the designation of the printer to be employed. The display control means reflects, on the print previews of the printers whose print setups are changed, the changed print setups obtained by changing the print setups of the pieces of print setup information in response to the input to the print setup section. The print setup change means changes, according to the input to the print setup section displayed on the print preview display screen, the pieces of print setup information of printers designated by the input to the print setup section. The print instruction means instructs the printer determined via the employed printer determination section displayed on the print preview display screen to print the designated data to be printed according to the print setup of the pieces of print setup information changed by the print setup change means.

This makes it possible to, on the print preview display screen, easily change the print setups of the designated data to be printed and confirm the print previews corresponding to the changed print setups. This also makes it possible to print according to the changed print setups by use of the designated printer. On this account, a user can easily confirm the print previews, change the print setups and print by use of the printers, as a series of operations.

The print control device includes print setup storage processing means, the display control means causing the display device to display a print preview display screen for displaying a first print setup storage instruction section that receives an instruction for storing the pieces of print setup information changed by the print setup change means, in a case where the first setup storage instruction section receives the instruction for storing the pieces of print setup information, the print setup storage processing means reflecting, on the pieces of print setup information stored in the storage device, the pieces of changed print setup information.

According to the above arrangement, the display control means causes the display device to display the print preview display screen for displaying the first print setup storage instruction section that receives the instruction for storing the pieces of print setup information changed by the print setup change means. In the case where the first setup storage instruction section receives the instruction for storing the pieces of print setup information, the print setup storage processing means reflects, on the pieces of print setup information stored in the storage device, the pieces of changed print setup information.

This makes it possible to store the print setups changed on the print preview display screen in such a manner that the changed print setups is reflected on the print setups stored in the storage device. It is accordingly possible to easily use the changed print setups in successive printings.

The print control device includes: print setup change means; and print instruction means, the display control means (i) causing the display device to display a print preview display screen for displaying a print setup section and an employed printer determination section, the print setup section being for receiving an input regarding the print setups, and the employed printer determination section being for receiving designation of a printer to be employed, and (ii) reflecting, on the print previews of all printers, print setups obtained by changing the print setups of the pieces of print setup information in response to the input to the print setup section, the print setup change means changing the pieces of print setup information of the all printers according to the input to the print setup section, the print instruction means instructing the printer determined via the employed printer determination section to print the designated data according to the print setup of the pieces of print setup information changed by the print setup change means.

According to the above arrangement, the display control means causes the display device to display the print preview display screen for display the print setup section and the employed printer determination section, the print setup section being for receiving the input regarding the print setups, and the employed printer determination section being for receiving the designation of the printer to be employed. The display control means reflects, on the print previews of the all printers, the print setups obtained by changing the print setups of the pieces of print setup information in response to the input to the print setup section. The print setup change means changes the pieces of print setup information of the all printers according to the input to the print setup section. The print instruction means instructs the printer determined via the employed printer determination section to print the designated data to be printed according to the print setup of the pieces of print setup information changed by the print setup change means.

This makes it possible to, on the print preview display screen, easily change the print setups of the designated data to be printed and confirm the print previews corresponding to the changed print setups. Further, the changed print setups are reflected on the all print previews. This makes it possible to easily select a desired printer as a printer to be employed by comparing the print previews. This also makes it possible to print according to the changed print setups by use of the designated printer. On this account, a user can easily confirm the print previews, change the print setups and print by use of the printers, as a series of operations.

The printer searching means of the print control device acquires printer information on a function of the respective printers extracted by the searching operation, and causes the storage device to store the printer information in correlation with the respective printers from which the printer information is acquired, the display control means causes the display device to display a print preview display screen for displaying a sort instruction section for sorting the printers on the basis of the function of the respective printers, and the display control means sorts the printer information of the respective printers in a case where an instruction for sorting is inputted to the sort instruction section, and changes, according to a result obtained by the sorting, an order of displaying the print previews displayed on the display device.

According to the above arrangement, the printer searching means acquires the printer information on the function of the respective printers extracted by the searching operation, and causes the storage device to store the printer information in correlation with the respective printers from which the printer information is acquired. The display control means causes the display device to display the print preview display screen for displaying the sort instruction section for sorting the printers on the basis of the function of the respective printers. The display control means sorts the printer information of the respective printers in the case where the instruction for sorting is inputted to the sort instruction section. Further, the display control means changes, according to the result obtained by the sorting, the order of displaying the print previews displayed on the display device.

This allows a user to immediately and easily determine, according to the result obtained by the sorting under sort conditions such as color/monochrome printing, a print speed and print resolution, a printer appropriate for printing the designated data.

The print control device includes print setup storage processing means, the display control means causing the display device to display the print preview display screen for displaying a second print setup storage instruction section and a named print setup information extraction instruction section, the second print setup storage instruction section being for receiving an instruction for naming the pieces of print setup information changed by the print setup change means and storing the pieces of named print setup information, and the named print setup information extraction instruction section being for receiving an instruction for extracting the pieces of named print setup information, and the display control means reflecting, on the print previews of printers respectively corresponding to print setups of the pieces of named print setup information extracted by the print setup storage processing means, the print setups of the pieces of named print setup information extracted by the print setup storage processing means, in a case where the second print setup storage instruction section receives the instruction for naming the pieces of print setup information, the print setup storage processing means putting a designated name on the pieces of changed print setup information, and causing the storage device to store the pieces of named print setup, and in a case where the named print setup information extraction instruction section receives the instruction for extracting the pieces of named print setup information, the print setup storage processing means extracting the pieces of named print setup information from the storage device.

According to the above arrangement, the display control means causes the display device to display the print preview display screen for displaying the second print setup storage instruction section and the named print setup information extraction instruction section, the second print setup storage instruction section being for receiving the instruction for naming the pieces of print setup information changed by the print setup change means and storing the pieces of named print setup information, and the named print setup information extraction instruction section being for receiving the instruction for extracting the pieces of named print setup information. Further, the display control means reflects, on the print previews of printers respectively corresponding to print setups of the pieces of named print setup information extracted by the print setup storage processing means, the print setups of the pieces of named print setup information extracted by the print setup storage processing means. In the case where the second print setup storage instruction section receives the instruction for naming the pieces of print setup information, the print setup storage processing means puts the designated name on the pieces of changed print setup information, and causes the storage device to store the pieces of named print setup. Further, the print setup storage processing means extracts the pieces of named print setup information from the storage device in the case where the named print setup information extraction instruction section receives the instruction for extracting the pieces of named print setup information.

This allows a user to store a print setup that the user often uses and a print setup that the user often selects, and also to easily extract the stored print setups. Accordingly, a user can efficiently set a print setup appropriate for the user's purpose.

The display control means of the print control device correlates waiting job quantities of the respective printers with the print previews corresponding to the respective printers, and causes the display device to display a print preview display screen for displaying the waiting job quantities correlated with the print previews.

According to the above arrangement, not only the print previews corresponding to the printers but also the waiting job quantities of the printers are displayed on the print preview display screen. This allows a user to visually know a length of waiting time prior to start of printing by use of the printers in a case where the user instructs the printer to print.

The display control means of the print control device enlarges, on a print preview display screen, parts of images of the displayed print previews corresponding to the respective printers.

According to the above arrangement, the parts of the images of the displayed print previews are enlarged on the print preview display screen. This allows a user to visually know difference in resolution between the printers.

In a case where a user inputs an instruction for turning a page, the display control means pages, on a print preview display screen, the print previews of the respective printers in such a manner that the print previews corresponding to the respective printers are paged in synchronization with one another.

According to the above arrangement, in the case where the user inputs the instruction for turning the page, the print previews corresponding to the respective printers are paged on the print preview display screen in such a manner that the print previews corresponding to the respective printers are paged in synchronization with one another. This allows a user to easily compare, over a plurality of pages, the print previews corresponding to the printers.

The display control means of the print control device automatically and simultaneously pages, on a print preview display screen, the print previews of the respective printers at a speed that reflects a printing speed of the respective printers.

According to the above arrangement, the print previews of the respective printer are automatically and simultaneously paged, on the print preview display screen, at the speed that reflects the printing speed of the respective printers. This allows a user to visually know the printing speed of the respective printers from the print previews corresponding to the respective printers and therefore easily compare difference in printing speed between the printers.

The present invention is not limited to the description of the embodiments above, but may be altered by a skilled person within the scope of the claims. An embodiment based on a proper combination of technical means disclosed in different embodiments is encompassed in the technical scope of the present invention.

REFERENCE SIGNS LIST

1: printing system
10: personal computer (print control device)
21: first printer
22: second printer
23: third printer
101: control section
103: storage section (storage device)
104: display section (display device)
222: print preview creation section (print preview creation means)
223: display control section (display control means)
224: print instruction section (print instruction means)
225: printer searching section (printer searching means)
226: print setup change section (print setup change means)
227: print setup storage processing section (print setup storage processing means)
302: input section (named print setup information extraction instruction section)
303: input section (sort instruction section)
306: check box (employed printer determination section)
307: check box (employed printer determination section)
308: check box (employed printer determination section)
321: check box (first print setup storage instruction section)
322: input section (second print setup storage instruction section)
323: print setup section
324: detail preview
401: waiting job quantity display region

The invention claimed is:

1. A printer control device, which is communicable with plural types of printers via a network and controls the plural types of printers by means of a shared printer driver compatible with the plural types of printers, the printer control device, comprising:

a storage device;

printer searching means for searching for the printers connected to the network so as to extract printers from among the printers, and causing to store, in the storage device, pieces of print setup information on print setups to be set in each extracted printer in such a manner that the pieces of print setup information are correlated with the each extracted printer respectively;

print preview creation means for creating pieces of print preview data of print previews for each extracted printer respectively, each piece of the print preview data showing a print result of designated data;

display control means for causing an identical display device to simultaneously display, as the print preview, the pieces of print preview data created by the print preview creation means, the display device displaying the pieces of print preview data in such a manner that the pieces of print preview data reflect the pieces of print setup information of the printers respectively corresponding to the respective pieces of print preview data and are arranged in association with the printers respectively corresponding to the respective pieces of print preview data, the display control means (i) causing the display device to display a print preview display screen for displaying a print setup section and an employed printer determination section, the print setup section being for receiving an input regarding the print setups and the employed printer determination section being for receiving designation of a printer to be employed, and (ii) reflecting, on the print previews of printers whose print setups are changed, the changed print setups obtained by changing the print setups of the pieces of print setup information in response to the input to the print setup section;

print setup change means changing, according to the input to the print setup section, the pieces of print setup information of printers designated by the input to the print setup section;

print instruction means instructing the printer determined via the employed printer determination section to print the designated data according to the print setup of the pieces of print setup information changed by the print setup change means; and a print setup storage processing means, the display control means causing the display device to display the print preview display screen for displaying a second print setup storage instruction section and a named print setup information extraction instruction section, the second print setup storage instruction section being for receiving an instruction for naming the pieces of print setup information changed by the print setup change means and storing the pieces of named print setup information, and the named print setup information extraction instruction section being for receiving an instruction for extracting the pieces of named print setup information, and the display control means reflecting, on the print previews of printers respectively corresponding to print setups of the pieces of named print setup information extracted by the print setup storage processing means, the print setups of the pieces of named print setup information extracted by the print setup storage processing means, in a case where the second print setup storage instruction section receives the instruction for naming the pieces of print setup information, the print setup storage processing means putting a designated name on the pieces of changed print setup information, and causing the storage device to store the pieces of named print setup, and in a case where the named print setup information extraction instruction section receives the instruction for extracting the pieces of named print setup information, the print setup storage processing means extracting the pieces of named print setup information from the storage device.

2. The print control device as set forth in claim 1, comprising print setup storage processing means, the display control means causing the display device to display a print preview display screen for displaying a first print setup storage instruction section that receives an instruction for storing the pieces of print setup information changed by the print setup change means, in a case where the first setup storage instruction section receives the instruction for storing the pieces of print setup information, the print setup storage processing means reflecting, on the pieces of print setup information stored in the storage device, the pieces of changed print setup information.

3. The print control device as set forth in claim 1, comprising:

print setup change means; and
print instruction means, the display control means (i) causing the display device to display a print preview display screen for displaying a print setup section and an employed printer determination section, the print setup section being for receiving an input regarding the print setups, and the employed printer determination section being for receiving designation of a printer to be employed, and (ii) reflecting, on the print previews of all printers, print setups obtained by changing the print setups of the pieces of print setup information in response to the input to the print setup section, the print setup change means changing the pieces of print setup information of the all printers according to the input to the print setup section, the print instruction means instructing the printer determined via the employed printer determination section to print the designated data according to the print setup of the pieces of print setup information changed by the print setup change means.

4. The print control device as set forth in claim 1, wherein:

the printer searching means acquires printer information on a function of the respective printers extracted by the searching operation, and causes the storage device to store the printer information in correlation with the respective printers from which the printer information is acquired, the display control means causes the display device to display a print preview display screen for displaying a sort instruction section for sorting the printers on the basis of the function of the respective printers, and the display control means sorts the printer information of the respective printers in a case where an instruction for sorting is inputted to the sort instruction section, and changes, according to a result obtained by the sorting, an order of displaying the print previews displayed on the display device.

5. The print control device as set forth in claim 1, wherein:

the display control means correlates waiting job quantities of the respective printers with the print previews corresponding to the respective printers, and causes the display device to display a print preview display screen for displaying the waiting job quantities correlated with the print previews.

6. The print control device as set forth in claim 1, wherein:

the display control means enlarges, on a print preview display screen, parts of images of the displayed print previews corresponding to the respective printers.

7. The print control device as set forth in claim 1, wherein:

in a case where a user inputs an instruction for turning a page, the display control means pages, on a print preview display screen, the print previews of the respective printers in such a manner that the print previews corresponding to the respective printers are paged in synchronization with one another.

8. The print control device as set forth in claim 1, wherein:

the display control means automatically and simultaneously pages, on a print preview display screen, the print previews of the respective printers at a speed that reflects a printing speed of the respective printers.

9. A printer control method for communicating with plural types of printers via a network and controlling the plural types of printers by means of a shared printer driver compatible with the plural types of printers, the printer control method comprising:

a printer searching step for searching for the printers connected to the network so as to extract printers from among the printers, and causing to store, in the storage device, pieces of print setup information on print setups to be set in each extracted printer in such a manner that the pieces of print setup information are correlated with the each extracted printer respectively;

a print preview creation step for creating pieces of print preview data of print previews for each extracted printer respectively, each piece of the print preview data showing a print result of designated data;

a display control step for causing an identical display device to simultaneously display, as the print preview, the pieces of print preview data created in the print preview creation step, the display device displaying the pieces of print preview data in such a manner that the pieces of print preview data reflect the pieces of print setup information of the printers respectively corresponding to the respective pieces of print preview data and are arranged in association with the printers respectively corresponding to the respective pieces of print preview data, the display control step (i) causing the display device to display a print preview display screen for displaying a print setup section and an employed printer determination section, the print setup section being for receiving an input regarding the print setups and the employed printer determination section being for receiving designation of a printer to be employed, and (ii) reflecting, on the print previews of printers whose print setups are changed, the changed print setups obtained by changing the print setups of the pieces of print setup information in response to the input to the print setup section;

print setup change step changing, according to the input to the print setup section, the pieces of print setup information of printers designated by the input to the print setup section;

print instruction step instructing the printer determined via the employed printer determination section to print the designated data according to the print setup of the pieces of print setup information changed by the print setup change step; and a print setup storage processing step, the display control step causing the display device to display the print preview display screen for displaying a second print setup storage instruction section and a named print setup information extraction instruction section, the second print setup storage instruction section being for receiving an instruction for naming the pieces of print setup information changed by the print setup change step and storing the pieces of named print setup information, and the named print setup information extraction instruction section being for receiving an instruction for extracting the pieces of named print setup information, and the display control step reflecting, on the print previews of printers respectively corresponding to print setups of the pieces of named print setup information extracted by the print setup storage processing step, the print setups of the pieces of named print setup information extracted by the print setup storage processing step, in a case where the second print setup storage instruction section receives the instruction for naming the pieces of print setup information, the print setup storage processing step putting a designated name on the pieces of changed print setup information, and causing the storage device to store the pieces of named print setup, and in a case where the named print setup information extraction instruction section receives the instruction for extracting the pieces of named print setup information, the print setup storage processing step extracting the pieces of named print setup information from the storage device.

10. A printing system, comprising:
a printer control device; and
plural types of printers connected to the printer control device via a network, the printer control device, which is communicable with plural types of printers via a network and controls the plural types of printers by means of a shared printer driver compatible with the plural types of printers, the printer control device, comprising:
a storage device;
printer searching means for searching for the printers connected to the network so as to extract printers from among the printers, and causing to store, in the storage device, pieces of print setup information on print setups to be set in each extracted printer in such a manner that the pieces of print setup information are correlated with the each extracted printer respectively;

print preview creation means for creating pieces of print preview data of print previews for each extracted printer respectively, each piece of the print preview data showing a print result of designated data;

display control means for causing an identical display device to simultaneously display, as the print preview, the pieces of print preview data created by the print preview creation means, the display device displaying the pieces of print preview data in such a manner that the pieces of print preview data reflect the pieces of print setup information of the printers respectively corresponding to the respective pieces of print preview data and are arranged in association with the printers respectively corresponding to the respective pieces of print preview data, the display control means (i) causing the display device to display a print preview display screen for displaying a print setup section and an employed printer determination section, the print setup section being for receiving an input regarding the print setups and the employed printer determination section being for receiving designation of a printer to be employed, and (ii) reflecting, on the print previews of printers whose print setups are changed, the changed print setups obtained by changing the print setups of the pieces of print setup information in response to the input to the print setup section;

print setup change means changing, according to the input to the print setup section, the pieces of print setup information of printers designated by the input to the print setup section,;

print instruction means instructing the printer determined via the employed printer determination section to print the designated data according to the print setup of the pieces of print setup information changed by the print setup change means; and a print setup storage processing means, the display control means causing the display device to display the print preview display screen for displaying a second print setup storage instruction section and a named print setup information extraction instruction section, the second print setup storage instruction section being for receiving an instruction for naming the pieces of print setup information changed by the print setup change means and storing the pieces of named print setup information, and the named print setup information extraction instruction section being for receiving an instruction for extracting the pieces of named print setup information, and the display control means reflecting, on the print previews of printers respectively corresponding to print setups of the pieces of named print setup information extracted by the print setup storage processing means, the print setups of the pieces of named print setup information extracted by the print setup storage processing means, in a case where the second print setup storage instruction section receives the instruction for naming the pieces of print setup information, the print setup storage processing means putting a designated name on the pieces of changed print setup information, and causing the storage device to store the pieces of named print setup, and in a case where the named print setup information extraction instruction section receives the instruction for extracting the pieces of named print setup information, the print setup storage processing means extracting the pieces of named print setup information from the storage device.

11. A non-transitory computer-readable recoding medium, in which a program for causing a computer to serve as means of a printer control device is stored, the printer control device, which is communicable with plural types of printers via a network and controls the plural types of printers by means of a shared printer driver compatible with the plural types of printers, the printer control device, comprising:

a storage device;

printer searching means for searching for the printers connected to the network so as to extract printers from among the printers, and causing to store, in the storage device, pieces of print setup information on print setups to be set in each extracted printer in such a manner that the pieces of print setup information are correlated with the each extracted printer respectively;

print preview creation means for creating pieces of print preview data of print previews for each extracted printer respectively, each piece of the print preview data showing a print result of designated data;

display control means for causing an identical display device to simultaneously display, as the print preview, the pieces of print preview data created by the print preview creation means, the display device displaying the pieces of print preview data in such a manner that the pieces of print preview data reflect the pieces of print setup information of the printers respectively corresponding to the respective pieces of print preview data and are arranged in association with the printers respectively corresponding to the respective pieces of print preview data, the display control means (i) causing the display device to display a print preview display screen for displaying a print setup section and an employed printer determination section, the print setup section being for receiving an input regarding the print setups and the employed printer determination section being for receiving designation of a printer to be employed, and (ii) reflecting, on the print previews of printers whose print setups are changed, the changed print setups obtained by changing the print setups of the pieces of print setup information in response to the input to the print setup section;

print setup change means changing, according to the input to the print setup section, the pieces of print setup information of printers designated by the input to the print setup section,;

print instruction means instructing the printer determined via the employed printer determination section to print the designated data according to the print setup of the pieces of print setup information changed by the print setup change means; and a print setup storage processing means, the display control means causing the display device to display the print preview display screen for displaying a second print setup storage instruction section and a named print setup information extraction instruction section the second print setup storage instruction section being for receiving an instruction for naming the pieces of print setup information changed by the print setup change means and storing the pieces of named print setup information, and the named print setup information extraction instruction section being for receiving an instruction for extracting the pieces of named print setup information, and the display control means reflecting, on the print previews of printers respectively corresponding to print setups of the pieces of named print setup information extracted by the print setup storage processing means, the print setups of the pieces of named print setup information extracted by the print setup storage processing means, in a case where the second print setup storage instruction section receives the instruction for naming the pieces of print setup information, the print setup storage processing means putting a designated name on the pieces of changed print setup information, and causing the storage device to store the pieces of named print setup, and in a case where the named print setup information extraction instruction section receives the instruction for extracting the pieces of named print setup information, the print setup storage processing means extracting the pieces of named print setup information from the storage device.

* * * * *